(12) United States Patent
Lee et al.

(10) Patent No.: US 9,906,908 B2
(45) Date of Patent: Feb. 27, 2018

(54) METHOD OF OPERATING COMMUNICATION AND ELECTRONIC DEVICE FOR SUPPORTING SAME

(71) Applicant: Samsung Electronics Co., Ltd., Suwon-si, Gyeonggi-do (KR)

(72) Inventors: Kwangryeol Lee, Gumi-si (KR); Wonsu Kim, Gumi-si (KR); Jonghwan Oh, Daegu (KR); Jiwoo Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 14/922,545

(22) Filed: Oct. 26, 2015

(65) Prior Publication Data

US 2016/0127869 A1 May 5, 2016

(30) Foreign Application Priority Data

Oct. 30, 2014 (KR) ........................ 10-2014-0149227

(51) Int. Cl.
*H04W 4/02* (2009.01)
*H04W 76/02* (2009.01)
*G06F 3/01* (2006.01)
*G06F 1/16* (2006.01)
*H04M 1/57* (2006.01)

(52) U.S. Cl.
CPC ............ *H04W 4/023* (2013.01); *G06F 3/017* (2013.01); *H04W 76/023* (2013.01); *G06F 1/1694* (2013.01); *H04M 1/575* (2013.01); *H04W 4/028* (2013.01)

(58) Field of Classification Search
CPC ............... H04M 1/575; H04M 1/0266; H04M 2250/02; H04W 4/02; H04W 4/206; H04W 4/005; H04W 4/008; H04W 8/005; H04W 4/025; G06F 3/017; G06F 1/1694; G06F 1/1626; G06F 1/163; G06F 2200/1637

See application file for complete search history.

(56) References Cited

U.S. PATENT DOCUMENTS

| 8,478,307 | B1* | 7/2013 | Hayes | ................... | H04W 4/025 |
| | | | | | 455/456.6 |
| 2001/0046884 | A1* | 11/2001 | Yoshioka | ............... | G01C 21/26 |
| | | | | | 455/564 |
| 2006/0240872 | A1* | 10/2006 | Yuan | ..................... | G06F 1/1626 |
| | | | | | 455/564 |
| 2009/0005981 | A1* | 1/2009 | Forstall | .................. | G01C 21/20 |
| | | | | | 701/431 |
| 2012/0172060 | A1 | 7/2012 | Qing et al. | | |

(Continued)

FOREIGN PATENT DOCUMENTS

KR 10-2012-0079370 A 7/2012
KR 10-2014-0031584 A 3/2014

*Primary Examiner* — Olumide T Ajibade Akonai
(74) *Attorney, Agent, or Firm* — Jefferson IP Law, LLP

(57) ABSTRACT

A communication method and an electronic device for supporting the same are provided. The communication method includes forming a group for communication with at least one external electronic device, receiving location information from the at least one external electronic device, selecting at least one of the at least one external electronic device to communicate with, based on a motion of the electronic device, and communicating with the at least one selected external electronic device.

18 Claims, 15 Drawing Sheets

(56) References Cited

U.S. PATENT DOCUMENTS

| | | | |
|---|---|---|---|
| 2013/0268304 A1* | 10/2013 | Doshi | G06Q 10/02 |
| | | | 705/5 |
| 2014/0066093 A1 | 3/2014 | Yoo et al. | |
| 2014/0073391 A1* | 3/2014 | Lin | G07F 17/3209 |
| | | | 463/16 |
| 2014/0313127 A1* | 10/2014 | Deng | G06F 3/0487 |
| | | | 345/156 |
| 2014/0364062 A1* | 12/2014 | Koarai | H04W 76/023 |
| | | | 455/41.2 |

* cited by examiner

METHOD OF OPERATING COMMUNICATION AND ELECTRONIC DEVICE FOR SUPPORTING SAME

CROSS-REFERENCE TO RELATED APPLICATION(S)

This application claims the benefit under 35 U.S.C. § 119(a) of a Korean patent application filed on Oct. 30, 2014 in the Korean Intellectual Property Office and assigned Serial number No. 10-2014-0149227, the entire disclosure of which is hereby incorporated by reference.

TECHNICAL FIELD

The present disclosure relates to a method of communicating with an external electronic device selected from a group, which is formed using an ad hoc network, based on a motion of the electronic device or a voice signal and an electronic device for supporting the same.

BACKGROUND

An electronic device may form a group with an external electronic device and communicate with another electronic device within the group. A representative example of the communication is push-to-talk (PTT) group communication. The PTT group communication is a unidirectional service in which only a user having an opportunity to transmit a voice signal among users included in the group can transmit the voice signal to a counterpart. When a particular user transmits a voice signal by pressing a button for transmitting the voice signal, the remaining users may receive the voice signal from the particular user while they do not press the button. The PTT group communication is provided to immediately transmit the voice signal between the users included in the group in a one-to-one or a one-to-many type. The users included in the group may select a counterpart to which the voice signal is transmitted through a screen of the electronic device and transmit the voice signal to the selected counterpart by pressing the button.

The above information is presented as background information only to assist with an understanding of the present disclosure. No determination has been made, and no assertion is made, as to whether any of the above might be applicable as prior art with regard to the present disclosure.

SUMMARY

When transmitting a voice signal to a counterpart by using push-to-talk (PTT) group communication, the user should select the counterpart on a screen of an electronic device and make a touch input on a button while watching the screen, which causes cumbersomeness. Further, since the user should transmit a voice signal by controlling the screen, the transmission is dangerous during an action requiring physical activity.

Aspects of the present disclosure are to address the above-mentioned problems and/or disadvantages and to provide at least the advantages described below. Accordingly, an aspect of the present disclosure is to provide a communication operation method and an electronic device for supporting the same according to an embodiment of the present disclosure may detect a motion of the electronic device, select an external electronic device based on the motion, and communicate with the selected external electronic device.

Another aspect of the present disclosure is to provide a communication operation method and an electronic device for supporting the same. When the electronic device receives a voice signal including a direction indication language, the electronic device may select an external electronic device based on the direction indication language and communicate with the selected external electronic device.

In accordance with an aspect of the present disclosure, an electronic device is provided. The electronic device includes a first communication unit configured to communicate with at least one external electronic device, a sensor unit configured to detect a motion of the electronic device, and a controller configured to form a group for communication with the at least one external electronic device, receive location information from the at least one external electronic device, select at least one of the at least one external electronic device to communicate with, based on the motion of the electronic device detected through the sensor unit, and control the first communication unit to communicate with at least one selected external electronic device.

In accordance with another aspect of the present disclosure, an electronic device is provided. The electronic device includes a first communication unit configured to communicate with at least one external electronic device, an audio processor configured to receive a voice signal including a direction indication language, and a controller configured to form a group for communication with the at least one external electronic device, receive location information from the at least one external electronic device, select at least one external electronic device corresponding to the direction indication language, and control the first communication unit to communicate with at least one selected external electronic device.

In accordance with another aspect of the present disclosure, a method of communicating by an electronic device is provided. The method includes forming a group for communication with at least one external electronic device, receiving location information from the at least one external electronic device, selecting at least one of the at least one external electronic device to communicate with, based on a motion of the electronic device, and communicating with at least one selected external electronic device.

In accordance with another aspect of the present disclosure, a method of communicating by an electronic device is provided. The method includes forming a group for communication with at least one external electronic device, receiving location information from the at least one external electronic device within the group, when a direction indication language is received, selecting at least one external electronic device corresponding to the direction indication language, and communicating with the at least one selected external electronic device.

According to a communication operation method and an electronic device for supporting the same according to an embodiment of the present disclosure, the electronic device can select an external electronic device based on a motion of the electronic device, a motion of a wearable device connected to the electronic device, or a direction indication language included in a voice signal. Accordingly, the user can select the external electronic device to communicate with without any controlling of the screen and thus easily communicate with the external electronic device during an action requiring physical activity.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
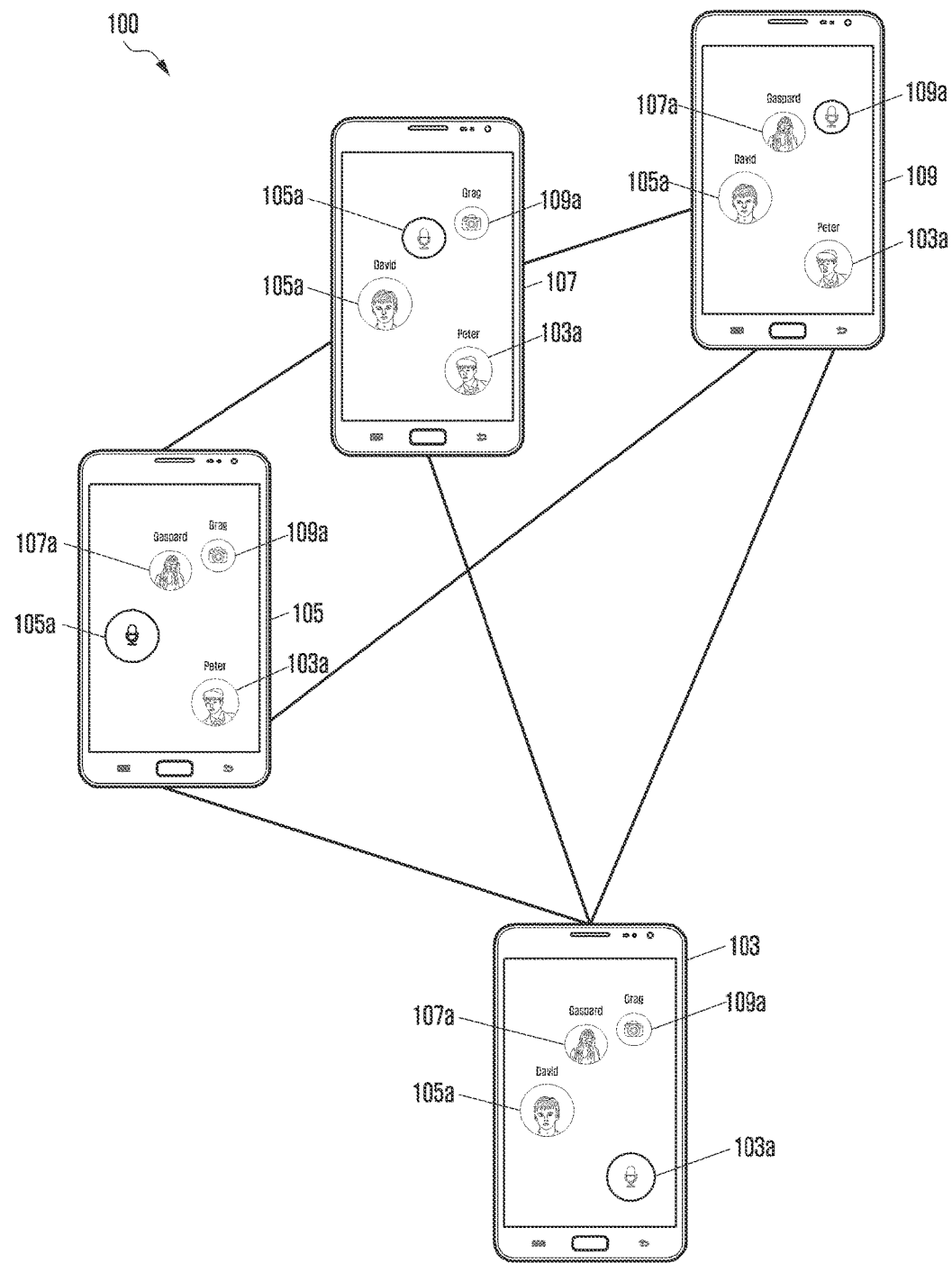
FIG. 1 illustrates a configuration of an electronic device within a group according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expressions "have", "may have", "include", or "may include" refer to the existence of a corresponding feature (e.g., numeral, function, operation, or constituent element such as component), and does not exclude one or more additional features.

As used herein, the expressions "A or B", "at least one of A and/or B", or "one or more of A and/or B" may include any or all possible combinations of items enumerated together. For example, the expression "A or B", "at least one of A and B", or "at least one of A or B" may include (1) at least one A, (2) at least one B, or (3) both at least one A and at least one B.

The terms used herein are merely for the purpose of describing particular embodiments and should not be intended to limit the scope of other embodiments. As used herein, singular forms may include plural forms as well unless the context clearly indicates otherwise. Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, eve the terms defined herein may not be construed to exclude embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

As used herein, the term "user" may indicate a person who uses an electronic device or a device (e.g., an artificial intelligence electronic device) that uses an electronic device.

According to embodiments of the present disclosure, an electronic device may perform communication (for example, voice communication or data communication) with at least one external electronic device included in a group formed through an ad hoc network. The voice and/or data communication may use a half duplex scheme. The half duplex scheme refers to a unidirectional scheme in which, when at least two electronic devices communicate with each other and one electronic device performs transmission, the other electronic device performs reception. When the electronic device is in a transmission mode, an external electronic device may automatically enter a reception mode and output a voice message received from the electronic device in the transmission mode.

Further, the ad hoc network may use multi-hop routing to overcome restriction on a short communication range. The electronic device may expand a communication range between electronic devices within the group from about 100 up to 500 m through a relay function using the multi-hop routing. The ad hoc network may have a mesh structure. The mesh structure refers to a structure in which the electronic device is connected to one or more other electronic devices within the network.

FIG. 1 illustrates a configuration of an electronic device according an embodiment of the present disclosure.

Referring to FIG. 1, an electronic device 103 and external electronic devices 105, 107, and 109 form a group 100. According to an embodiment of the present disclosure, the group 100 may form an ad hoc network based on Wi-Fi. The ad hoc network does not require infrastructure such as a server, and may be provided for communication between electronic devices using the ad hoc network.

While the group is formed, the electronic device 103 and the external electronic devices 105, 107, and 109 within the group 100 may share (for example, transmit/receive) location information acquired through a location collector. The electronic device 103 may receive location information from the external electronic devices 105, 107, and 109 belonging to the group. The electronic device 103 may transmit location information of the electronic device 103 to the external electronic devices 105, 107, and 109.

From a viewpoint of each of the external electronic devices 105, 107, and 109, the electronic device 105 may transmit/receive location information to/from the external electronic device 103, 107, and 109. The electronic device 107 may transmit/receive location information to/from the external electronic devices 103, 105, and 109. The electronic device 109 may transmit/receive location information to/from the external electronic devices 103, 105, and 107. Each of the electronic devices 103, 105, and 107 within the group 100 may be a transmission electronic device and a reception electronic device at the same time.

The electronic device may periodically receive location information on the external electronic devices within the group and periodically acquire and update relative direction information and distance information. The electronic device may arrange and display the external electronic devices in an icon form based on the acquired relative direction information and distance information. For example, a display unit of the electronic device 103 may display an icon 103a of the electronic device 103, an icon 105a of the external electronic device 105, an icon 107a of the external electronic device 107, and an icon 109a of the external electronic device 109. A display unit of the electronic device 105 may display the icon 105a of the electronic device 105, the icon 103a of the external electronic device 103, the icon 107a of the external electronic device 107, and the icon 109a of the external electronic device 109. A display unit of the electronic device 107 may display the icon 107a of the electronic device 107, the icon 103a of the external electronic device 103, the icon 105a of the external electronic device 105, and the icon 109a of the external electronic device 109. A display unit of the electronic device 109 may display the icon 109a of the electronic device 109, the icon 103a of the external electronic device 103, the icon 105a of the external electronic device 105, and the icon 107a of the external electronic device 107. The icon of the electronic device is expressed as a microphone, but the present disclosure is not limited thereto and the icon of the electronic device may be expressed by a picture or an emoticon.

According to an embodiment of the present disclosure, the electronic device may periodically update and display icon locations of the external electronic devices according to motions of the external electronic devices within the group 100 based on the relative direction information and distance information. When the motion of the electronic device is detected, the electronic device may select the external electronic device according to the motion and communicate with the selected external electronic device. Further, when the electronic device receives a voice signal including a direction indication language, the electronic device may select the external electronic device based on the direction indication language and communicate with the selected external electronic device.

Figure 2:
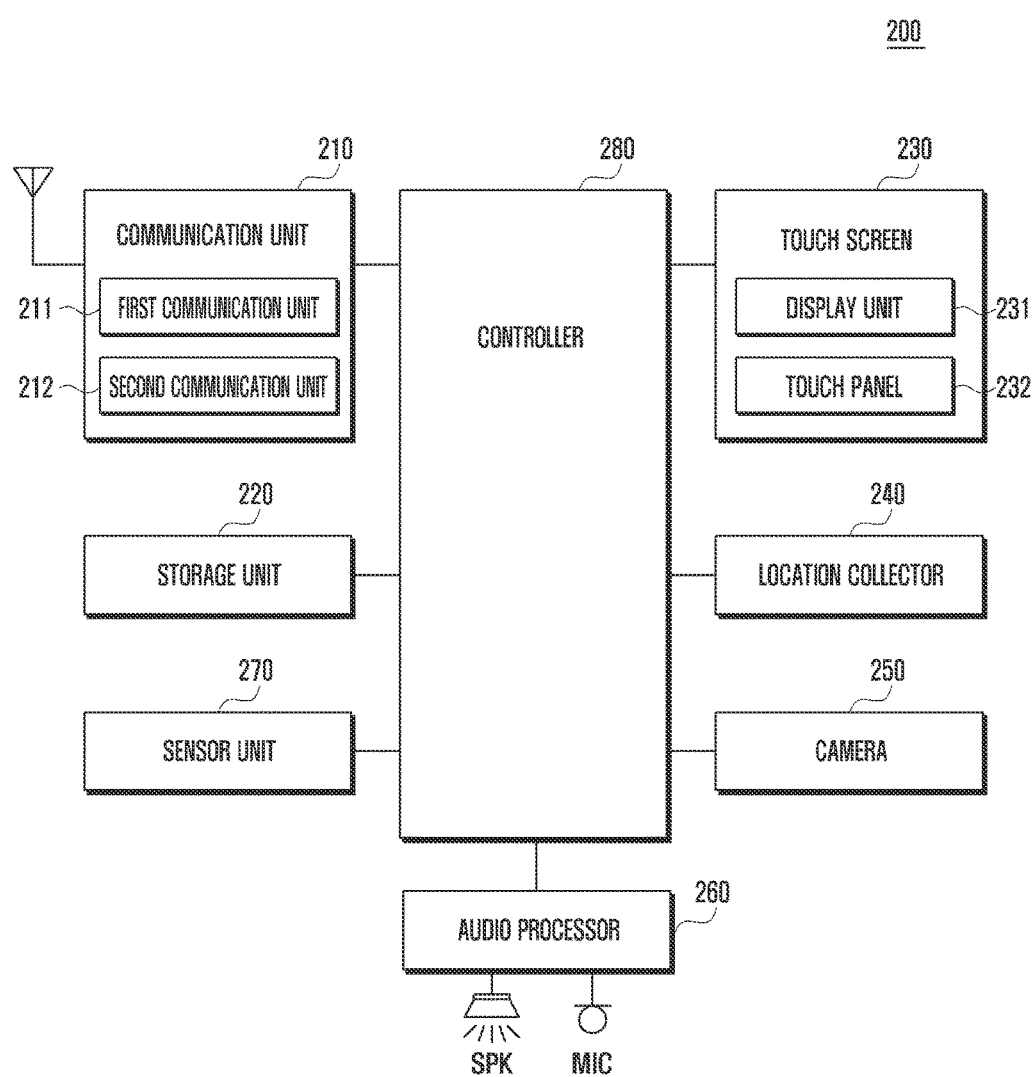
FIG. 2 illustrates a configuration of an electronic device according to an embodiment of the present disclosure.

FIG. 2 illustrates a configuration of an electronic device according to an embodiment of the present disclosure.

Referring to FIG. 2, an electronic device 200 according to an embodiment of the present disclosure may include a communication unit 210, a storage unit 220, a touch screen 230, a location collector 240, a camera 250, an audio processor 260, a sensor unit 270, and a controller 280.

The communication unit 210 may communicate between the electronic device 200 and external electronic devices. For example, the communication unit 210 may be connected to a network through wired or wireless communication to communicate with the external electronic device. The wireless communication, for example, may include Wi-Fi, Bluetooth (BT), near field communication (NFC), and the like. The wireless communication may also include at least one of cellular communications (for example, LTE, LTE-A, CDMA, WCDMA, UMTS, WiBro, or GSM). The wired communication, for example, may include at least one of a universal serial bus (USB), a high definition multimedia interface (HDMI), recommended standard 232 (RS-232), and a plain old telephone service (POTS).

According to an embodiment of the present disclosure, the communication unit 210 may include a first communication unit 211 and a second communication unit 212.

The first communication unit 211 may transmit a broadcasting message to the external electronic device in a particular direction within the group formed based on the ad hoc network. The first communication unit 211 may receive a response message of the broadcasting message from the external electronic device. The first communication unit 211 may transmit/receive (e.g., share) location information between the electronic devices within the group. The first communication unit 211 may perform communication (for example, transmit/receive voice message, a text message, and data such as a video) between the electronic devices within the group formed based on the ad hoc network.

The second communication unit 212 may connect the electronic device 200 to a wearable device. The electronic device may receive a signal for selecting the external electronic device from the wearable device connected through the second communication unit 212. The second communication unit 212 may transfer the signal received from the wearable device to the controller 280.

The storage unit 220 may include a program memory for storing an operating program of the electronic device 200 and a data memory for storing data such as log information and contents generated during execution of a program.

According to an embodiment of the present disclosure, the storage unit 220 may store a voice message, a text message, and data (for example, pictures or dynamic images) transmitted/received between the electronic devices within the group. The storage unit 220 may map and store relative direction information related to the direction indication language included in the voice signal for selecting the external electronic device. The storage unit 220 may store speaker voice information as comparison information for distinguishing a speaker (for example, man, woman, child, or old person) in the received voice signal under a control of the controller 280. The storage unit 220 may store image information corresponding to the speaker voice information.

The touch screen 230 may include a display unit 231 and a touch panel 232 which are integrally implemented. The display unit 231 may display various screens according to the use of the electronic device 200. The display 231 may include a liquid crystal display (LCD), a light emitting diode (LED) display, an organic light emitting diode (OLED) display, a micro electro mechanical system (MEMS) display, or an electronic paper display. The display 231 may display various types of content (e.g., text, images, videos, icons, or symbols) for the user. The touch panel 232 may receive a touch input, a gesture input, a proximity input, or a hovering input using, for example, an electronic pen or a user's body part.

According to an embodiment of the present disclosure, the display unit 231 may display icons of the external electronic devices according to the relative direction information and distance information under a control of the controller 280. When the external electronic device is selected under a control of the controller 280, the display unit 231 may display a communication connection through a connection line to indicate that the selected external electronic device is connected to communicate with the electronic device 200. When the external electronic device is selected based on a motion or a voice signal of the electronic device 200 under a control of the controller 280, the electronic device may activate and display the icon of the selected external electronic device. For example, the display unit 231 may display an active icon with a solid line and an inactive icon with a dotted line under a control of the controller 280. When a communication request is received from one of the external electronic devices within the group under a control of the controller 280, the electronic device may display a text message in accordance with the relative direction information on the one external electronic device having made the communication request.

The location collector 240 may acquire a current location of the electronic device 200 through a navigation device such as a GPS, global navigation satellite system (GNSS), or a GALILEO. The location collector 240 may acquire the current location of the electronic device 200 by using a neighboring access point (AP) of which a location is already known. The location collector 240 may acquire location information on the electronic device 200 through a response message of a broadcasting message transmitted in a particular direction through antenna beamforming.

The camera 250 supports a photography function of the electronic device 200. The camera 250 may support photographing an image (for example, a still image or a dynamic image) of the subject. The camera 250 may photograph a predetermined subject according to a control of the controller 280 and transmit photographed data to the display unit 231 and the controller 280. The camera 250 may include an image sensor (or a camera sensor) for converting an input optical signal into an electrical signal and an image signal processor for converting the electrical signal input from the image sensor into digital image data.

According to an embodiment of the present disclosure, the camera 250 may photograph an image or a dynamic image of the user who uses the selected external electronic device under a control of the controller 280. When the camera 250 photographs the dynamic image of the user who uses the external electronic device under a control of the controller 280, the camera 250 may extract only a voice signal of the user and photograph the dynamic image with the voice signal. The camera 250 may transfer the photographed dynamic image and voice signal to the controller 280 under a control of the controller 280.

The audio processor 260 may transmit, to a speaker (SPK), an audio signal input from the controller 280, and may perform a function of transferring an audio signal such as a voice input from a microphone (MIC) to the controller 280. The speaker may output audio data received from the external electronic device through the communication unit 210 or stored in the storage unit 220. The speaker may output sound signals related to various operations (functions) performed by the electronic device 200. Although not illustrated, attachable and detachable earphones, a headphone, or a headset may be connected to the speaker of the electronic device 200 through an external port. The microphone may receive an external sound signal and process the received sound signal to be an electrical voice signal.

According to an embodiment of the present disclosure, the audio processor 260 may input a voice to be transmitted to the selected external electronic device and output the voice received from the external electronic device under a control of the controller 260. The microphone may include a plurality of microphones (e.g., a first microphone, a second microphone, and a third microphone) having a directivity pattern based on a particular arrangement. The electronic device 200 including a plurality of microphones may receive a voice signal from the selected external electronic device and process the receive voice signal to be an electrical voice signal based on at least some of a time and a distance of the voice, and intensity of the sound (note) (for example, decibel difference).

The sensor unit 270 may measure a physical quantity or detect an operating state of the electronic device 200, and convert the measured or detected information into an electrical signal. The sensor unit 270 may include at least one of, for example, a gesture sensor, a gyro sensor, an acceleration sensor, and an earth magnetic field sensor.

According to an embodiment of the present disclosure, a motion angle in a direction of the head of the electronic device 200 may be measured using the earth magnetic field sensor. A motion of the electronic device 200 may be detected using the acceleration sensor and the gyro sensor.

The controller 280 controls general operations of the electronic device 200 and a signal flow between internal components of the electronic device 200, processes data, and controls power supply to the components from the battery.

According to an embodiment of the present disclosure, the controller 280 may form a group with at least one external electronic device to communicate through the first communication unit 211. The controller 280 may receive location information from at least one external electronic device through the first communication unit 211. The controller 280 may acquire current location information on the electronic device through the location collector 240. The controller 280 may periodically acquire location information on the electronic devices through the location collector to acquire location movements of the electronic devices within the group and transmit/receive data through the first communication unit 211.

According to an embodiment of the present disclosure, when location information is transmitted/received between the electronic devices, the controller 280 may share information on the electronic devices. The information on the electronic device may include device identification information and image information. When the information on the electronic device includes image information, the controller 280 may display an icon by using the image information.

The controller 280 may compare the received location information and the current location information on the electronic device and determine and display relative direction information and distance information on the external electronic device. The controller 280 may update and display the relative direction information and distance information on each electronic device within the group which is moving based on the periodically shared location information.

According to an embodiment of the present disclosure, the controller 280 may display the icons of the external electronic devices according to the relative direction information and distance information on the external electronic devices based on the icon of the electronic device. When displaying the icons of the external electronic devices according to the relative direction information on the external electronic devices based on the icon of the electronic device, the controller 280 may control the icons of the external electronic devices in proportion to the distance information (e.g., increase or decrease the size of the icons) and display the controlled icons of the external electronic devices. The controller 280 may detect a motion of the electronic device 200 by using the acceleration sensor and the gyro sensor. The controller 280 may select the external electronic device to communicate with, based on a motion of the electronic device in at least one of upward, downward, leftward, and rightward directions. The controller 280 may measure a motion angle in a direction of the head of the electronic device through the earth magnetic field sensor to select the external electronic device. The controller 280 may select the external electronic device to communicate with, based on a voice signal including a direction indication language through the audio processor 260.

According to an embodiment of the present disclosure, the controller 280 may receive motion information on a wearable device connected through the second communication unit 212 from the wearable device. The controller 280 may select the external electronic device to communicate with, based on the motion information. The controller 280 may display the icons of the electronic device and the selected external electronic device such that the icons are connected to each other through a connection line. The controller 280 may activate and display the icon of the selected external electronic device. After selecting the external electronic device to communicate with, the controller 280 may communicate with the selected external electronic device.

According to an embodiment of the present disclosure, the controller 280 may receive a communication request from one of the external electronic devices within the group. The communication request may be an operation for receiving a message (voice and/or text) or receiving data (e.g., pictures or dynamic images). When the communication request from the one external electronic device is detected, the controller 280 may notify of direction information on the external electronic device. For example, when the communication request corresponds to reception of a voice message, the controller 280 may control an audio parameter based on information on a direction in which the voice message is received and output the controlled audio parameter. When the communication request corresponds to reception of a voice message, the controller 280 may convert the voice message into a text message and output the text message in accordance with relative direction information on the external electronic device having transmitted the voice message. When the communication request corresponds to reception of a text message, the controller 280 may display the text message in accordance with relative direction information on the external electronic device having transmitted the text message.

Figure 3:
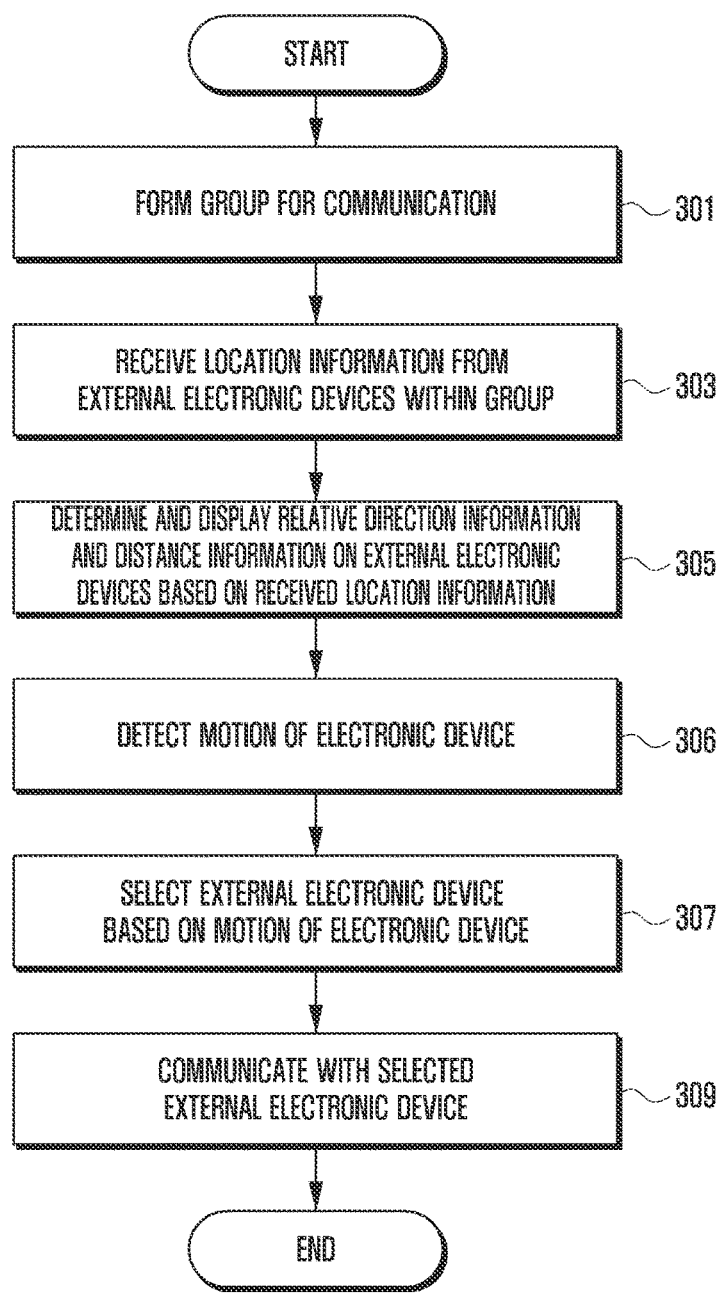
FIG. 3 is a flowchart illustrating a communication operation method of a transmission electronic device according to an embodiment of the present disclosure.

FIG. 3 is a flowchart illustrating a communication operation method of a transmission electronic device according to an embodiment of the present disclosure.

Referring to FIG. 3, the controller 280 forms a group for communication in operation 301. According to an embodiment of the present disclosure, the controller 280 may form a group with at least one external electronic device by using an ad hoc network based on short-range communication, for example, Wi-Fi.

The controller 280 receives location information from the external electronic device in operation 303. The controller 280 may acquire current location information on the electronic device 200 and transmit the acquired location information to the external electronic device. The electronic devices within the group may transmit/receive (e.g., share) the acquired location information through the location collector 240. The electronic devices within the group may periodically acquire and share location information. This may correspond to an operation for identifying movements of the external electronic devices. According to an embodiment of the present disclosure, the location information may be acquired using a neighboring AP. The controller 280 may transmit a broadcasting message in a particular direction through antenna beamforming of the electronic device 200 and acquire the location information through a response message of the broadcasting message.

According to an embodiment of the present disclosure, when sharing the location information, the electronic devices within the group may also share information on the electronic devices. The information on the electronic device may include device identification information and image information. When the information on the electronic device includes the image information, the controller 280 may display, on the display unit 231, an icon of the external electronic device by using the image information based on the location information in operation 305 described below. When the information on the electronic device includes no image information, the controller 280 may determine whether there is information matching the external electronic device in contacts of the electronic device 200. When the contacts include information matching the external electronic device, the controller 280 may display an icon by using an image of the external electronic device stored in the contacts. When the information on the electronic device includes no image information, the controller 280 may display an icon by using a default image. Alternatively, when the information on the electronic device includes no image information, the controller 280 may display an icon by using an image acquired through analysis of the voice signal received in FIG. 8 described below.

The controller 280 compares the received location information on the external electronic device and current location information on the electronic device 200, and determines and displays relative direction information and distance information on the external electronic device in operation 305. The controller 280 may calculate the relative direction information and distance information on the external electronic devices within the group based on the received location information. According to an embodiment of the present disclosure, the relative direction information and distance information may be information for determining locations of the icons of the external electronic devices based on the icon of the electronic device 200. As described above, the electronic devices within the group may periodically share the location information. The controller 280 may update and display the relative direction information and distance information on each electronic device within the group which is moving based on the periodically shared location information. The controller 280 may reflect the relative direction information and distance information calculated based on the received location information to display the icons of the external electronic devices on the display unit 231.

According to an embodiment of the present disclosure, a method of displaying the icons of the external electronic devices may include a method of displaying the icons of the external electronic devices according to the relative direction information and distance information on the external electronic devices based on the icon of the electronic device and a method of controlling and displaying the icons of the external electronic devices in proportion to the distance information based on the relative direction information on the external electronic devices from the icon of the electronic device (e.g., increase or decrease the size of the icons). A detailed description of the method of displaying the icons of the external electronic devices is described below with reference to FIGS. 4A and 4B.

The controller 280 detects a motion of the electronic device 200 in operation 306. As described above, the controller 280 may detect the motion of the electronic device 200 by using the acceleration sensor and the gyro sensor.

The controller 280 selects the external electronic device based on the motion of the electronic device in operation 307. An operation for selecting the external electronic device is an operation for communicating with the external electronic device. The operation for selecting the external electronic device may be an operation for indicating, by a head of the electronic device, a particular direction in which the external electronic device to communicate with exists. The communication may include transmission of a text message, a voice message, or data (for example, pictures or dynamic images).

According to another embodiment of the present disclosure, the controller 280 may receive motion information on a wearable device connected through the second communication unit 212 from the wearable device. The controller 280 may select the external electronic device to communicate with, based on the motion information. When the external electronic device to communicate with is selected using the wearable device, the controller 280 may indirectly input a gesture without a direct gesture input into the electronic device (e.g., a touch input on the icon of the external electronic device displayed on the display unit 231). When the wearable device is used, the wearable device may include a motion sensor (e.g., including the acceleration sensor and the gyro sensor) capable of recognizing the gesture. The wearable device may communicate with the electronic device 200 through the second communication unit 212. The wearable device may select the external electronic device through the gesture input in a direction of the head of the electronic device 200 and the motion of the wearable device worn on the user's wrist. For example, the controller 280 may select the external electronic device located in the particular direction through an action of the finger or arm indicating the particular direction (for example, a motion in at least one of upward, downward, leftward, and rightward directions) in a state where the wearable device is worn. The wearable device may transmit direction information to the electronic device 200.

The controller 280 may compare the direction information received from the wearable device with the calculated relative direction information on the external electronic device. When an external electronic device having matching direction information, based on a result of the comparison, the controller 280 may determine the matching external electronic device as the external electronic device to communicate with. The controller 280 may display the icons of the electronic device and the external electronic device to communicate with such that the icons are connected to each other through a connection line. The controller 280 may activate and display the icon of the external electronic device to communicate with.

According to an embodiment of the present disclosure, the controller 280 may accurately select the external electronic device in an indication direction according to the action of the finger or arm through Microsoft Kinect™ and/or an electromyography (EMG) sensor. The controller 280 may recognize an arm action and a finger motion through the Kinect™. The EMG sensor may be worn on the arm, and the controller 280 may measure a motion of the arm muscle through the EMG sensor and accurately recognize an indication direction according to the arm action.

The controller 280 may measure the motion of the electronic device through the acceleration sensor and the gyro sensor and may measure a motion angle in a direction of the head of the electronic device through the earth magnetic field sensor to select the external electronic device. The direction of the head of the electronic device may refer to an upper portion of the electronic device 200. For example, the controller 280 may store an initial azimuth of the electronic device 200 and a maximum azimuth of the motion of the electronic device 200. The controller 280 may select the external electronic device included in a range of the initial azimuth and the maximum azimuth as the external electronic device to communicate with. The controller 280 may detect a motion of the electronic device 200 in at least one of upward, downward, leftward, and rightward directions and select at least one external electronic device to communicate with. The controller 280 may select at least one external electronic device to communicate with according to the motion of the electronic device 200 in various patterns, such as a circular pattern.

The controller 280 may compare direction information according to a motion angle indicated by the head based on the motion of the electronic device with the calculated relative direction information on the external electronic device. When an external electronic device has matching direction information, based on a result of the comparison, the controller 280 may determine the external electronic device having the matching direction information as the external electronic device to communicate with. When the external electronic device is selected, the controller 280 may control the display unit 231 to display the icons of the electronic device and the selected external electronic device such that the icons are connected to each other through a connection line. The controller 280 may activate and display the icon of the selected external electronic device (for example, display the icon with a solid line). The controller 280 may display the icons such that the selected external electronic device is distinguished from the external electronic device, which has not been selected, by using different character colors or background colors of the icons.

The controller 280 may control the display unit 231 to display information on the selected external electronic device through a notification. The display unit 231 may display only the icon of the selected external electronic device or only information on the external electronic device (for example, image information or contact information) without displaying all the icons of the external electronic devices within the group.

According to an embodiment of the present disclosure, after selecting the external electronic device to communicate with, the controller 280 may perform an operation for inputting a message to be transmitted to the external electronic device. The type of the message may include a voice message such as push-to-talk (PTT), an instant message through a text input device, and a multimedia message service (MMS) message having a file attached thereto. After inputting the message, the controller 280 may detect an input for transmitting the message. According to an embodiment of the present disclosure, the input for transmitting the message may be a general request signal in a half duplex communication and may be, for example, an operation for pressing a hardware key or a send key implemented in the display unit 231 in software. The controller 280 may recognize the input for transmitting the message as an input for acquiring a right to control or a right to speak in voice communication between electronic devices within the group. For example, the user may input a voice message by pressing a microphone button displayed on the display unit 231, and then transmit the voice message to the selected external electronic device.

According to an embodiment of the present disclosure, when the controller 280 photographs and shares, for example, a dynamic image, the controller 280 may extract only a voice of the user who uses the selected external electronic device and encode the extracted voice together with the dynamic image. Since a method of extracting only the voice from the selected external electronic device is an already known technology and thus is apparent to those skilled in the art, a detailed description thereof will be omitted.

In operation 309, the controller 280 communicates with the external electronic device selected in operation 307. The communication may include an operation for transmitting a text message, a voice message, or data (for example, pictures or dynamic images). When the electronic device 200 communicates with the selected external electronic device, the controller 280 may also transmit direction information on the electronic device 200.

A method of selecting and communicating with the external electronic device based on the motion of the electronic device is described below with reference to FIGS. 5A to 5D.

Figure 4A:
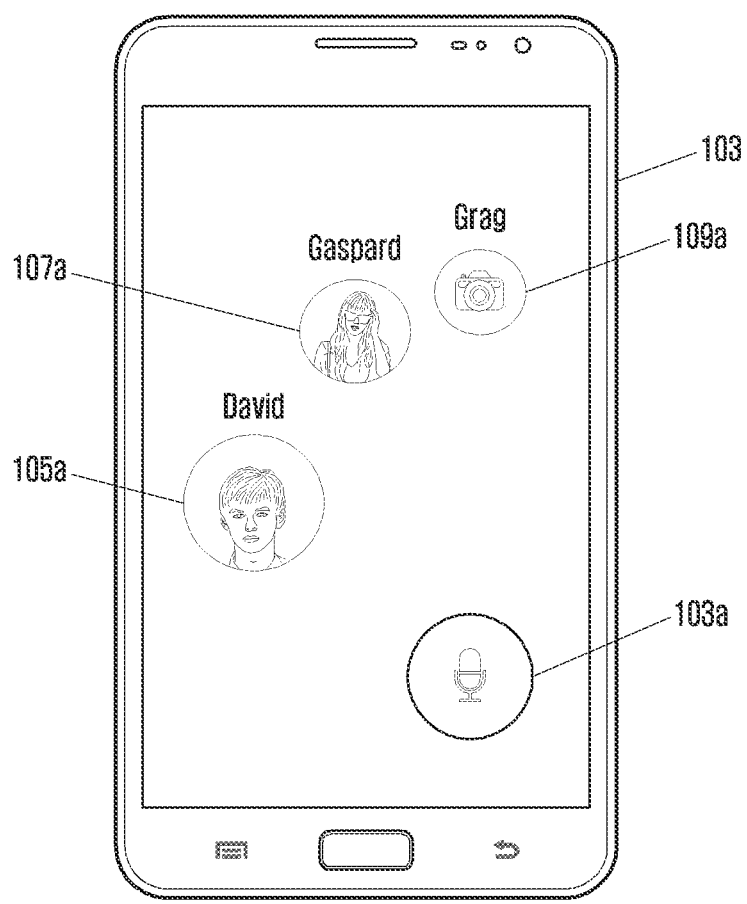
FIGS. 4A and 4B illustrate a method of displaying icons of external electronic devices based on relative direction information and distance information on an external electronic devices according to an embodiment of the present disclosure.
Figure 4B:
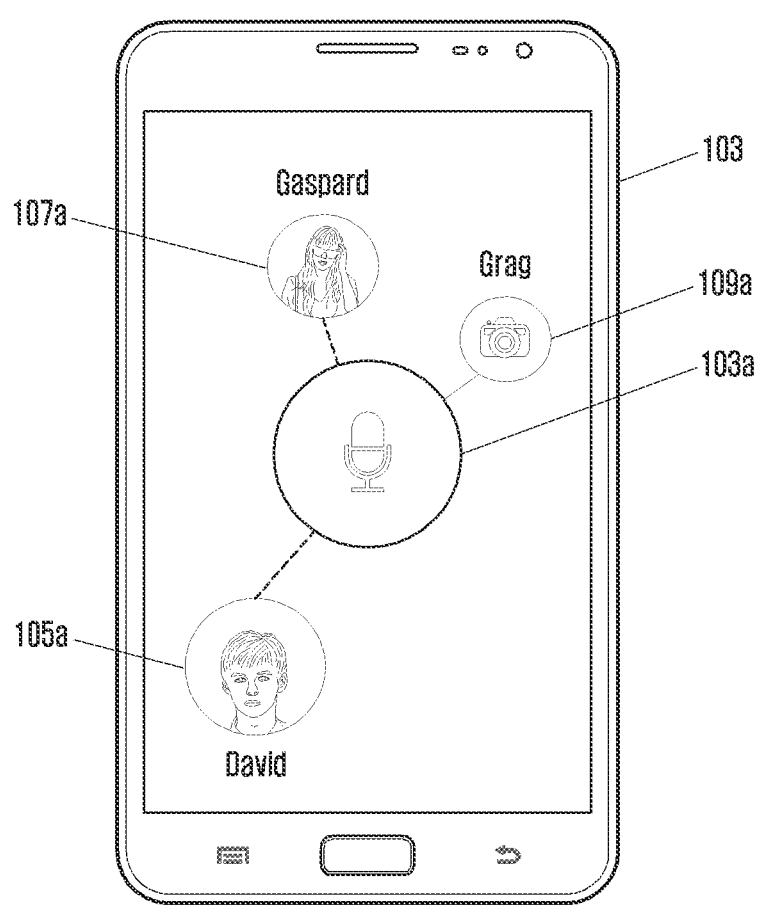

FIGS. 4A and 4B illustrate a method of displaying icons of external electronic devices based on relative direction information and distance information on the external electronic devices according to an embodiment of the present disclosure.

Referring to FIGS. 4A and 4B, it is assumed that users having electronic devices form a riding group to communicate during the riding according to an embodiment of the present disclosure.

Referring to FIG. 4A, the electronic device 103 of the user within the formed riding group, an electronic device of "David", an electronic device of "Gaspard", and an electronic device of "Grag" may share current location information. The electronic device 103 of the user may receive the location information from the electronic device of "David", the electronic device of "Gaspard", and the electronic device of "Grag" and calculate relative direction information and distance information on each of the electronic devices. The electronic device 103 may display icons of the external electronic devices according to the calculated relative direction information and distance information based on the icon 103a of the electronic device 103. When it is assumed that the icon of the electronic device 103 of the user is located in a direction of 0 degrees, the controller 280 may determine that the icon 105a of the electronic device of "David" is located in a direction of 300 degrees, determine that the icon 107a of the electronic device of "Gaspard" is located in a direction of 340 degrees, and determine that the icon 109a of the electronic device of "Grag" is located in a direction of 5 degrees according to the relative direction information and distance information based on the icon 103a of the electronic device 103 of the user.

As described above, the icons of the external electronic devices (e.g., 105a, 107a, and 109a) may be configured by image information included in the shared information on the electronic devices. When the information on the electronic device includes no image information, the controller 280 may determine whether there is information, which matches the external electronic device, in contacts of the electronic device 103. When the information includes information matching the external electronic device, the controller 280 may display an icon by using an image of the external electronic device stored in the contacts. Alternatively, the controller 280 may display the icon by using a default image.

The controller 280 may receive location information from the external electronic devices, calculate relative direction information and distance information on the external electronic devices based on the location information, and display the icons of the external electronic devices on corresponding locations. The user may intuitively identify the locations of the external electronic devices within the group by displaying the icons of the external electronic devices according to the relative direction information and distance information.

FIG. 4B illustrates another embodiment for displaying the icons of the external electronic devices based on the relative direction information and distance information on the external electronic devices. The controller 280 may display the icons according to the relative direction information on the external electronic devices based on the icon 103a of the electronic device 103 of the user, and control and display sizes of the icons of the external electronic devices in proportion to the distance information. For example, the controller 280 may display the icon of the external electronic device, which is located closer to the icon 103a of the electronic device 103 of the user, with the larger size. Alternatively, the controller 280 may display the icon of the external electronic device, which is located farther from the icon 103a of the electronic device 103 of the user, with the smaller size. Accordingly, the user may intuitively identify whether the external electronic device is located far from or close to his/her own electronic device. For example, as illustrated in FIG. 4B, the controller 280 may display the icons according to the relative direction information based on the icon 103a of the electronic device 103 of the user, and place the icon 105a of the electronic device of "David", which is located behind and close to the electronic device 103, in a direction of 200 degrees and display the icon 105a with the large size in proportion to the distance information. The controller 280 may place the icon 107a of the electronic device of "Gaspard", which is located ahead of and close to the electronic device 103 of the user, in a direction of 340 degrees and display the icon 107a with the large size. The controller 280 may place the icon 109a of the electronic device of "Grag", which is located ahead of and far from the electronic device 103 of the user, in a direction of 45 degrees and display the icon 109a with the small size.

FIGS. 5A to 5D illustrate a method of selecting and communicating with the external electronic device based on a motion of an electronic device according to an embodiment of the present disclosure.

Figure 5A:
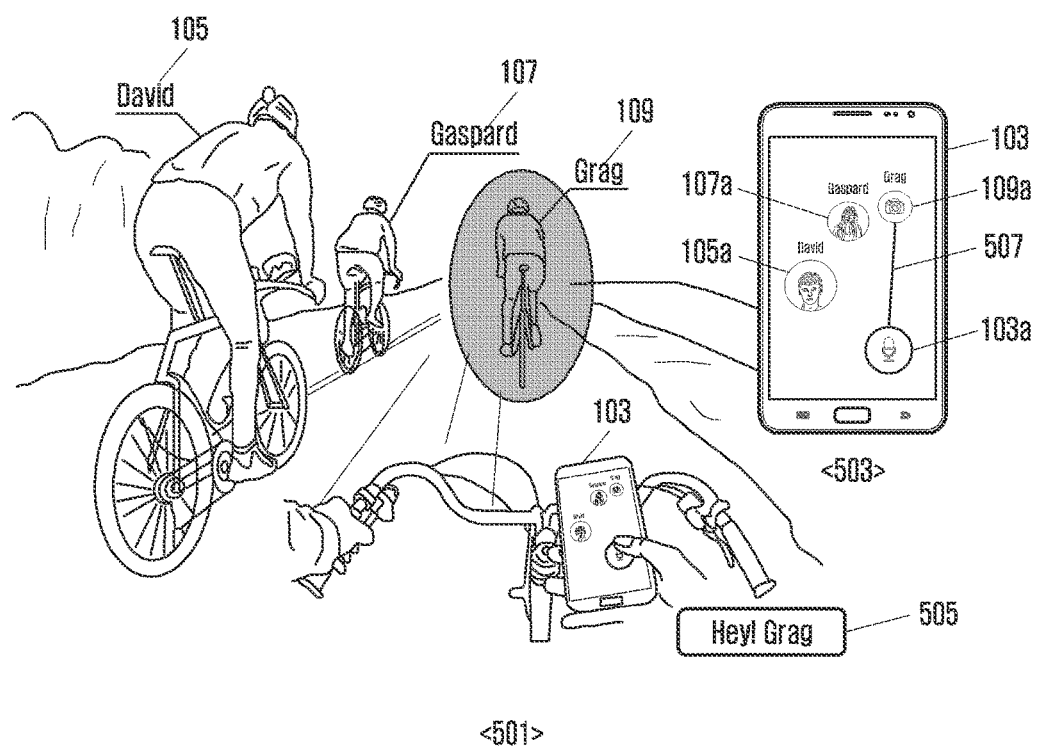
FIGS. 5A, 5B, 5C, and 5D illustrate a method of selecting an external electronic device based on a motion of an electronic device and communicating with the selected external electronic device according to an embodiment of the present disclosure.

Referring to FIGS. 5A to 5D, when it is assumed that the electronic device 103 is located in a direction of 0 degrees as indicated reference numeral 501 of FIG. 5A, the electronic device 103 may acquire relative direction information containing the electronic device 105 of "David" located in a direction of 300 degrees, the electronic device 107 of "Gaspard" located in a direction of 340 degrees, and the electronic device of "Grag" located in a direction of 5 degrees based on the electronic device 109.

When the motion of the electronic device 103 is detected through the sensor unit 270, the controller 280 may select the external electronic device located in a direction indicated by a head of the electronic device 103 according to the motion. The controller 280 may compare the direction indicated by the head of the electronic device 103 with the relative direction information on the external electronic devices. Based on a result of the comparison, the controller 280 may determine that the direction indicated by the head of the electronic device 103 matches the relative direction information on the electronic device 109 of "Grag" in reference numeral 501 of FIG. 5A. Accordingly, the controller 280 may select the electronic device 109 of "Grag" as the external electronic device to communicate with.

According to an embodiment of the present disclosure, as illustrated in reference numeral 503 of FIG. 5A, the controller 280 may display the icons of the external electronic devices based on the calculated relative direction information and distance information on the external electronic devices. As described above, when it is assumed that the electronic device 103 is located in a direction of 0 degrees, the electronic device 103 may display the icons such that the icon 105a of the electronic device of "David" is located in a direction of 300 degrees, the icon 107a of the electronic device of "Gaspard" is located in a direction of 340 degrees, and the icon 109a of the electronic device of "Grag" is located in a direction of 5 degrees according to the relative direction information and distance information based on the icon 103a of the electronic device 103. The controller 280 may display the icons such that the icon of the selected external electronic device (i.e., the icon 109a of the electronic device of "Grag") is connected to the icon 103a of the electronic device through a connection line 507 in reference numeral 501 of FIG. 5A. Accordingly, the user may intuitively identify the communication connection between the electronic device 103 and the electronic device 109 of "Grag". Further, when the controller 280 receives a voice signal of "Hey! Grag" 505, the controller 280 may transmit the voice signal to the electronic device 109 of "Grag".

The method of selecting the external electronic device based on the motion of the electronic device according to another embodiment of the present disclosure is described with reference to FIG. 5B. As indicated by reference numeral 511 of FIG. 5B, the electronic device 103 may acquire relative direction information containing the electronic device 105 of "David" located in a direction of 300 degrees, the electronic device 107 of "Gaspard" located in a direction of 340 degrees, and the electronic device 109 of "Grag" located in a direction of 5 degrees based on the electronic device 103 located in a direction of 0 degrees.

The controller 280 may detect the motion of the electronic device 103 moving in a left direction through the sensor unit 270 as indicated by reference numeral 515. The controller 280 may store an angle of the electronic device 109 of "Grag" as an initial azimuth, detect the motion of the electronic device 103 in a left direction 515 from the initial azimuth, and store an angle of the electronic device 105 of "David" as a maximum azimuth. The maximum azimuth may be an angle in a range including the electronic device 109 of "Grag", the electronic device 107 of "Gaspard", and the electronic device 105 of "David". The controller 208 may select the electronic device 105 of "David", the electronic device 107 of "Gaspard", and the electronic device 109 of "Grag" as the external electronic devices to communicate with, based on the initial azimuth and the maximum azimuth. When the controller receives a voice signal of "Hurry up! !" 517 after selecting the external electronic device to communicate with based on the initial azimuth and the maximum azimuth, the controller 280 may transmit the received voice signal to the selected external electronic devices (for example, the electronic device 105 of "David", the electronic device 107 of "Gaspard", and the electronic device 109 of "Grag").

Figure 5B:
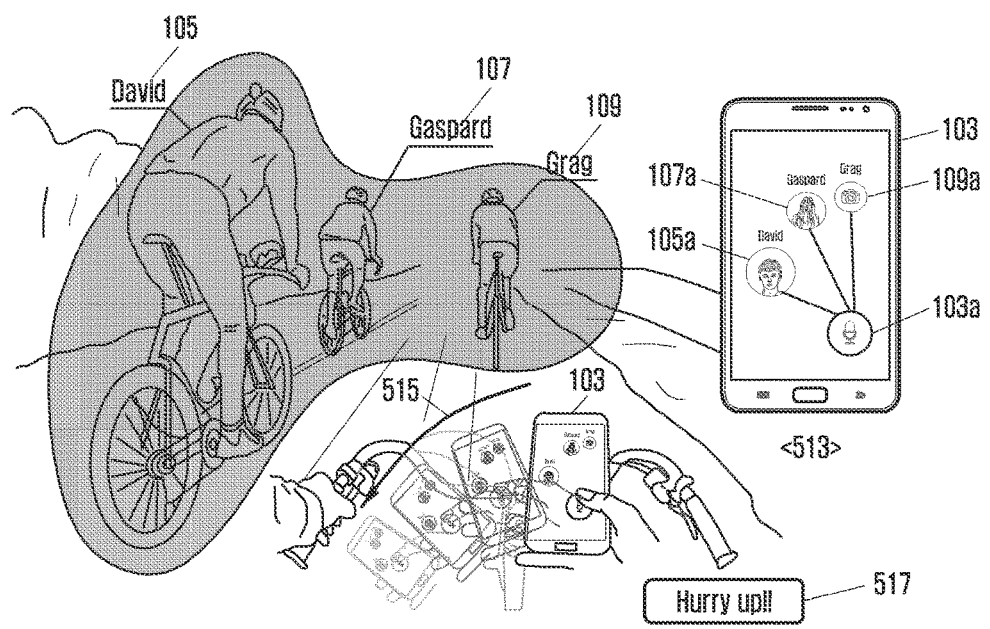

According to an embodiment of the present disclosure, as illustrated in reference numeral 513 of FIG. 5B, the controller 280 may display the icons of the external electronic devices based on the calculated relative direction information and distance information on the external electronic devices. As described above, the electronic device 103 may display the icons such that the icon 105a of the electronic device of "David" is located in a direction of 300 degrees, the icon 107a of the electronic device of "Gaspard" is located in a direction of 340 degrees, and the icon 109a of the electronic device of "Grag" is located in a direction of 5 degrees according to the relative direction information and distance information based on the icon 103a of the electronic device 103 located in a direction of 0 degrees. The controller 280 may display the icons such that the icons (e.g., icons 105a, 107a, and 109a) of the selected external electronic devices are connected through connection lines based on the icon 103a of the electronic device and the aforementioned initial azimuth and maximum azimuth. Accordingly, the user may intuitively identify the communication connection between the electronic device 103, and the electronic device 105 of "David", the electronic device 107 of "Gaspard", and the electronic device 109 of "Grag".

The method of selecting the external electronic device based on the motion of the electronic device according to another embodiment of the present disclosure is described with reference to FIG. 5C. As indicated by reference numeral 521 of FIG. 5C, the electronic device 103 may acquire relative direction information containing the icon 105a of the electronic device of "David" located in a direction of 200 degrees, the icon 107a of the electronic device of "Gaspard" located in a direction of 340 degrees, and the icon 109a of the electronic device of "Grag" located in a direction of 45 degrees based on the icon 103a of the electronic device of the user located in a direction of 0 degrees. As described above, the controller 280 may display the icon of the external electronic device located close to the electronic device 103 with the large size and the icon of the electronic device located far from the electronic device 103 with the small size in proportion to the distance information on the external electronic devices.

Figure 5C:
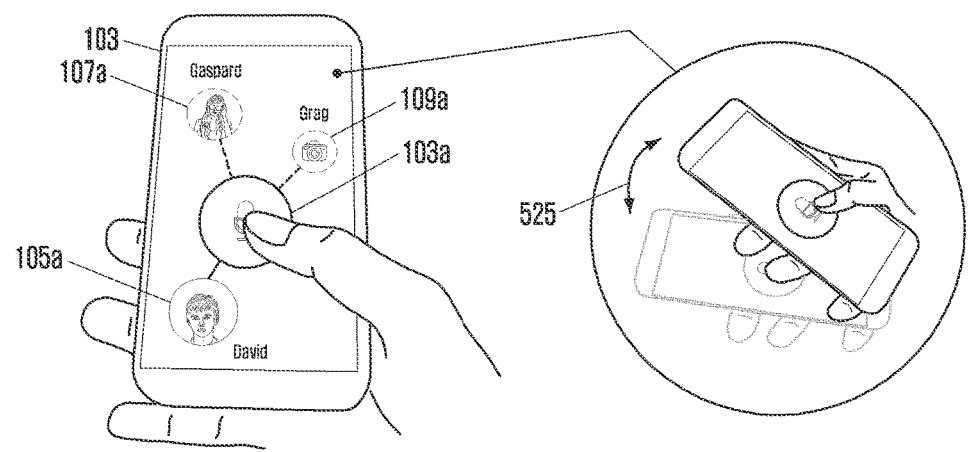

The controller 280 may detect the motion of the electronic device 103 moving in a direction of upward and downward directions 525 in reference numeral 523 of FIG. 5C. When the controller 280 detects the motion of the electronic device 103 in the upward and downward directions 525, the controller 280 may select the external electronic devices located ahead the electronic device 103 (e.g., the electronic device 107 of "Gaspard" and the electronic device 109 of "Grag") and/or the external electronic device located behind the electronic device 103 (e.g., the electronic device 105 of "David") as the external electronic devices to communicate with. The controller 280 may select the external electronic device as the external electronic device to communicate with, according to a motion angle in the upward and downward directions 525.

According to an embodiment of the present disclosure, the controller 280 may control to activate and display the icons of the selected external electronic devices based on the motion of the electronic device. For example, the controller 280 may automatically activate and display the icon 105a of the electronic device of "David" (e.g., display the icon 105a with the solid line) as indicated by reference numeral 521 of FIG. 5C. Accordingly, the user may identify that the electronic device of "David" is selected as the external electronic device to communicate with. In contrast, the controller 280 may deactivate and display the icons of the external electronic devices which have not been selected, for example, the icon 107a of the electronic device of "Gaspard" and the icon 109a of the electronic device of "Grag" (e.g., display the icons 107a and 109a with the dotted line) in reference numeral 521 of FIG. 5C. By activating or deactivating and displaying the icons, the user may distinguish the external electronic device to communicate with and the external electronic device to not communicate with. Subsequently, the controller 280 may communicate with the external electronic device corresponding to the activated icon.

The method of selecting the external electronic device to communicate with is not limited to a method of selecting the external electronic device based on the motion of the electronic device. The controller 280 may select the icon of the external electronic device to communicate with, through a touch input. The controller 280 may activate or deactivate the icon of the external electronic device through an input of touching the icon.

A method of selecting the external electronic device by using a wearable device according to another embodiment of the present disclosure will be described with reference to FIG. 5D. As indicated reference numeral 531 of FIG. 5D, the electronic device 103 may acquire direction information containing the electronic device 105 of "David" located in a direction of 300 degrees, the electronic device 107 of "Gaspard" located in a direction of 340 degrees, and the electronic device 109 of "Grag" located in a direction of 5 degrees based on the electronic device 103 located in a direction of 0 degrees. In the embodiment illustrated FIG. 5D, the user may be wearing a wearable device 535. While the user is wearing the wearable device 535, the controller 280 may detect a direction 537 indicated by a finger. The electronic device 103 may receive the direction 537 indicated by the finger from the wearable device. The electronic device 103 may compare the received direction information 537 indicated by the finger with relative direction information on the electronic device 105 of "David", the electronic device 107 of "Gaspard", and the electronic device 109 of "Grag". Through the comparison operation, the controller 280 may identify that the direction information 537 indicated by the finger matches the relative direction information on the electronic device 107 of "Gaspard" as indicated by reference numeral 531 of FIG. 5D. The controller 280 may determine the electronic device 107 of "Gaspard" as the external electronic device to communicate with and communicate with the electronic device 107 of "Gaspard".

Figure 5D:
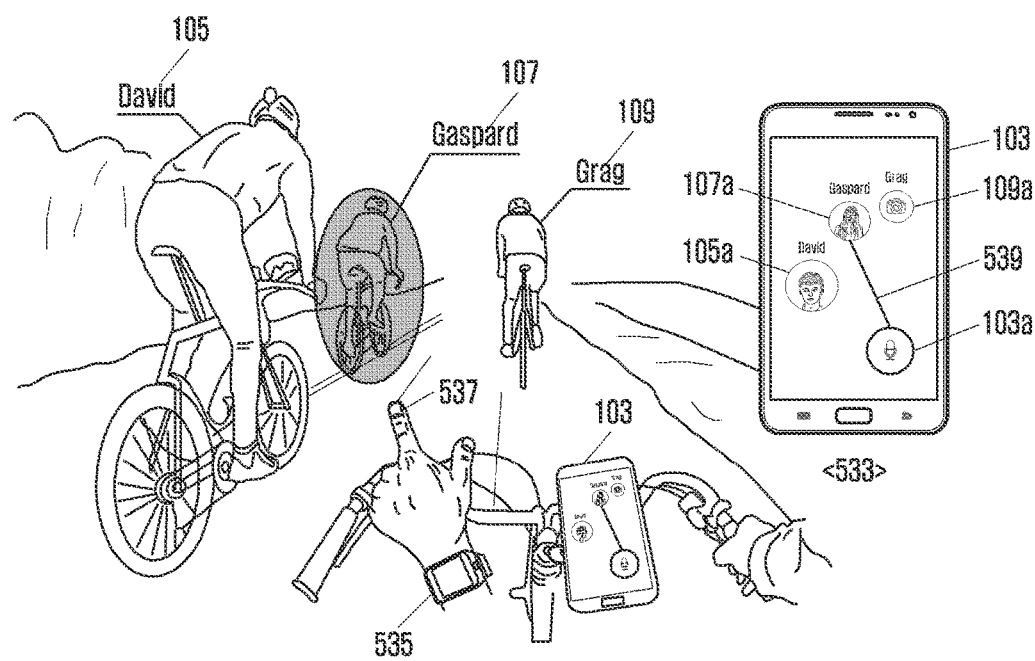

According to an embodiment of the present disclosure, as illustrated in reference numeral 533 of FIG. 5D, the controller 280 may display the icons of the external electronic devices based on the calculated relative direction information and distance information on the external electronic devices. As described above, the electronic device 103 may display the icons such that the icon 105a of the electronic device of "David" is located in a direction of 300 degrees, the icon 107a of the electronic device of "Gaspard" is located in a direction of 340 degrees, and the icon 109a of the electronic device of "Grag" is located in a direction of 5 degrees according to the relative direction information and the distance information based on the icon 103a of the electronic device located in a direction of 0 degrees. The controller 280 may display the icons such that the icons of the selected external electronic devices (i.e., the icon 107a of the electronic device of "Gaspard" and the icon 103a of the electronic device 103) are connected through a connection line 539 based on the received direction information indicated by the finger in reference numeral 531 of FIG. 5D. Accordingly, the user may intuitively identify the communication connection between the electronic device 103 and the electronic device 107 of "Gaspard".

Figure 6:
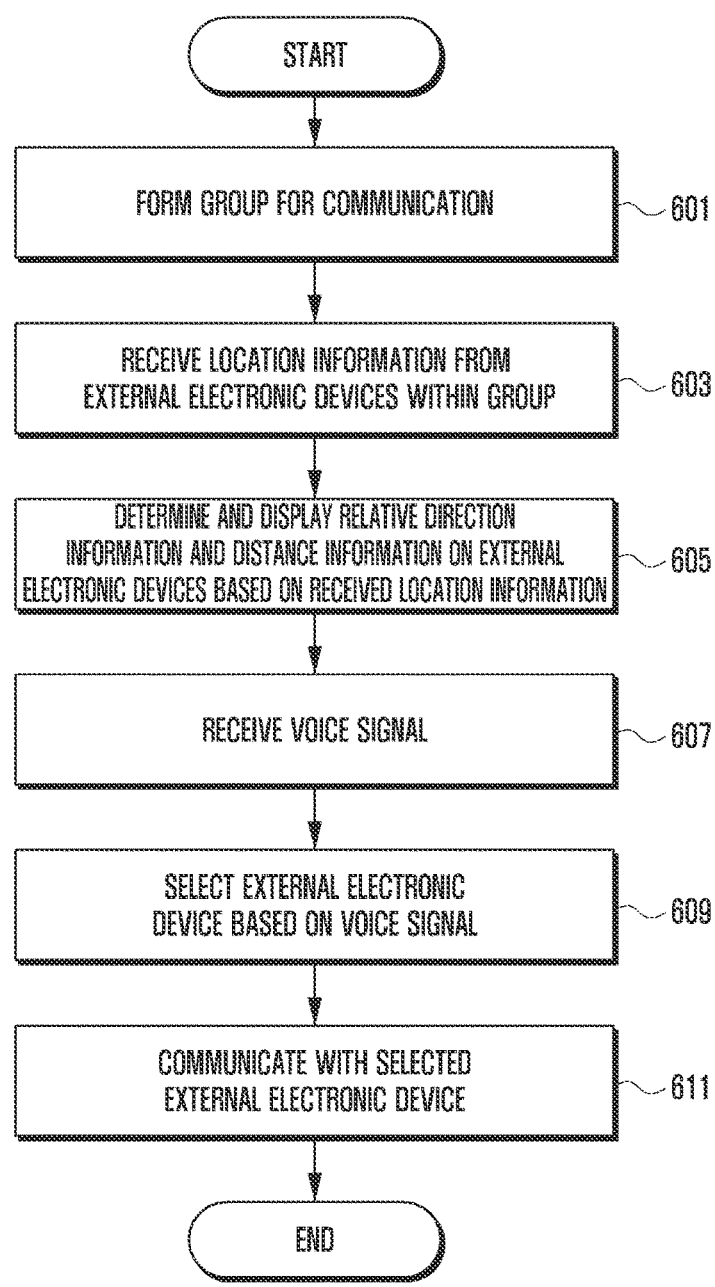
FIG. 6 is a flowchart illustrating a communication operation method of a transmission electronic device according to an embodiment of the present disclosure.

FIG. 6 is a flowchart illustrating a communication operation method of a transmission electronic device according to an embodiment of the present disclosure.

Referring to FIG. 6, the controller 280 forms a group for communication in operation 601. According to an embodiment of the present disclosure, the controller 280 may form a group with at least one external electronic device by using an ad hoc network based short-range communication, for example, Wi-Fi.

The controller 280 receives location information from the external electronic device in operation 603. The controller 280 may acquire current location information on the electronic device 200 and transmit the acquired location information to the external electronic device within the group. The electronic devices within the group may transmit/receive (e.g., share) the acquired location information through the location collector 240.

The controller 280 determines and displays relative direction information and distance information on the external electronic devices based on the received location information and the location information on the electronic device 200 in operation 605. The controller 280 may calculate the counterpart direction information and distance information on the external electronic devices within the group based on the received location information. According to an embodiment of the present disclosure, the counterpart direction information and distance information may be information for determining locations of the icons of the external electronic devices based on the icon of the electronic device 200. The controller 280 may reflect the relative direction information and the distance information calculated based on the received location information to display the icons of the external electronic devices on the display unit 231.

According to an embodiment of the present disclosure, a method of displaying the icons of the external electronic devices may include a method of displaying the icons of the external electronic devices according to the relative direction information and the distance information on the external electronic devices based on the icon of the electronic device and a method of displaying the icons of the external electronic devices based on the relative direction information and displaying the icons with the larger or smaller sizes in proportion to the distance information.

Since operations 601 to 605 of FIG. 6 are identical to operations 301 to 305 of FIG. 3, a detailed description thereof will be omitted.

The controller 280 receives a voice signal in operation 607, and selects the external electronic device based on the voice signal in operation 609. The controller 280 may receive the voice signal to be transmitted to the external electronic device. The voice signal may include a direction indication language and a message. The controller 280 may extract the direction indication language included in the voice signal and acquire direction information related to a direction indication language stored in the storage unit 220. The controller 280 may select the external electronic device corresponding to the direction indication language as the external electronic device to communicate with, based on the acquired direction information. Alternatively, the controller 280 may receive a voice signal including only the direction indication language, identify that the external electronic device matching the direction indication language, is selected (e.g., connect to the icon of the external electronic device to communicate with through a line and activate the icon of the external electronic device to communicate with), and then perform an operation for inputting a message. According to an embodiment of the present disclosure, when the external electronic device is selected based on the voice signal, a method of using both hands entirely for the activity (for example, riding) may be provided rather than the method of selecting the external electronic device by using one hand, for example, the method of selecting the external electronic device based on the touch input or the motion of the electronic device.

In operation 611, the controller 280 communicates with the external electronic device selected in operation 609. The controller 280 may transmit the message excluding the direction indication language from the voice signal to the selected external electronic device. When the electronic device 200 transmits the message to the selected external electronic device, the controller 280 may also transmit direction information on the electronic device 200.

The method of selecting the external electronic device based on the voice signal and communicating with the selected external electronic device is described below with reference to FIG. 7.

Figure 7:
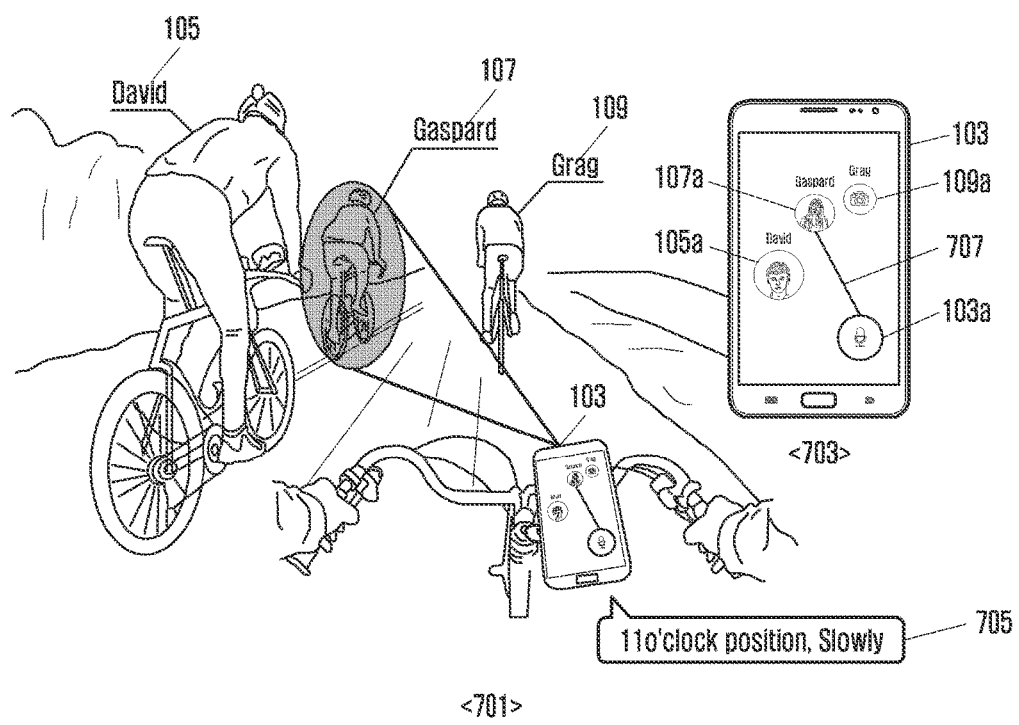
FIG. 7 illustrates a method of selecting an external electronic device based on a voice signal and communicating with the selected external electronic device according to an embodiment of the present disclosure.

FIG. 7 illustrates a method of selecting an external electronic device based on a voice signal according to an embodiment of the present disclosure.

Referring to FIG. 7, as indicated by reference numeral 701 of FIG. 7, the electronic device 103 may acquire direction information containing the electronic device 105 of "David" located in a direction of 300 degrees, the electronic device 107 of "Gaspard" located in a direction of 340 degrees, and the electronic device 109 of "Grag" located in a direction of 5 degrees based on the electronic device 103 located in a direction of 0 degrees. In the embodiment of FIG. 7, the controller 280 may select the external electronic device to communicate with, through the voice signal. The voice signal may include a direction indication language and a message.

For example, the controller 280 may receive a voice signal 705 saying "11 o'clock position, slowly". The controller 280 may extract the direction indication language "11 o'clock" from the voice signal. The controller 280 may acquire direction information related to the direction indication language stored in the storage unit 220. The controller 280 may select the external electronic device corresponding to the acquired direction indication language as the external electronic device to communicate with. The controller 280 may determine the electronic device 107 of "Gaspard" corresponding to the direction indication language "11 o'clock position" as the external electronic device to communicate with. After selecting the external electronic device to communicate with, the controller 280 may transmit the message "Slowly" excluding the direction indication language "11 o'clock position" from the voice signal 705 to the electronic device 107 of "Gaspard".

According to an embodiment of the present disclosure, as illustrated in reference numeral 703 of FIG. 7, the controller 280 may display the icons of the external electronic devices based on the calculated relative direction information and distance information on the external electronic devices. As described above, the electronic device 103 may display the icons such that the icon 105a of the electronic device of "David" is located in a direction of 300 degrees, the icon 107a of the electronic device of "Gaspard" is located in a direction of 340 degrees, and the icon 109a of the electronic device of "Grag" is located in a direction of 5 degrees according to the relative direction information and the distance information based on the icon 103a of the electronic device 103 located in a direction of 0 degrees. The controller 280 may display the icons such that the icon of the external electronic device selected through the voice signal, that is, the icon 107a of the electronic device of "Gaspard" is connected to the icon 103a of the electronic device through a connection lint 547 in reference numeral 701 of FIG. 7. Accordingly, the user may intuitively identify the communication connection between the electronic device 103 and the electronic device 107 of "Gaspard".

Figure 8:
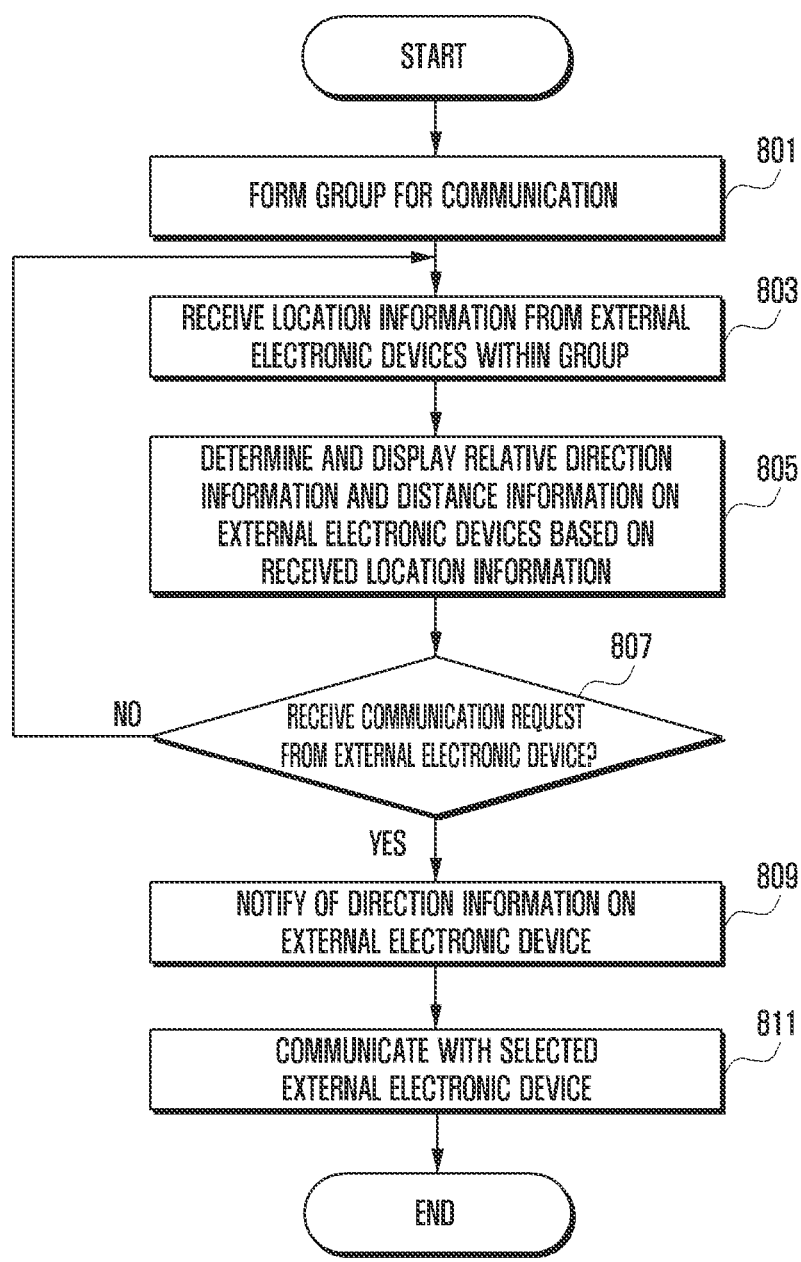
FIG. 8 is a flowchart illustrating a communication operation method of a reception electronic device according to an embodiment of the present disclosure.

FIG. 8 is a flowchart illustrating a communication operation method of a reception electronic device according to an embodiment of the present disclosure.

Referring to FIG. 8, the controller 280 activates group communication in operation 801. According to an embodiment of the present disclosure, an operation for activating the group communication may refer to forming a group with at least one external electronic device. The controller 280 may form a group with at least one external electronic device by using an ad hoc network based on short-range communication, for example, Wi-Fi.

The controller 280 receives location information from the external electronic device in operation 803. The controller 280 acquires current location information on the electronic device 200 and transmit the acquired location information to the external electronic device within the group. The electronic devices within the group may transmit/receive the location information acquired through the location collector 240 to share the location information. The electronic devices within the group may periodically acquire and share location information.

The electronic devices within the group may share information on the electronic devices when sharing the location information. The information on the electronic device may include device identification information and image information. When the information on the electronic device includes the image information, the controller 280 may display, on the display unit 231, an icon of the external electronic device by using the image information based on the location information in operation 805 described below. When the information on the electronic device includes no image information, the controller 280 may display an icon by using an image acquired through analysis of the received voice signal.

The controller 280 compares the received location information and the acquired location information on the electronic device 200, and determines and displays relative direction information and distance information on the external electronic devices in operation 805. The controller 280 may calculate the relative direction information and the distance information on the external electronic devices within the group based on the received location information. According to an embodiment of the present disclosure, the relative direction information and the distance information may be information for determining locations of the icons of the external electronic devices based on the icon of the electronic device 200. The controller 280 may reflect the relative direction information and the distance information calculated based on the received location information to display the icons of the external electronic devices.

Since operations 801 to 805 of FIG. 8 are identical to operations 301 to 305 of FIG. 3, a detailed description thereof will be omitted.

The controller 280 determines whether a communication request is received from one of the external electronic devices within the group in operation 807. For example, the communication request may be an operation for receiving a text message, a voice message, or data (e.g., pictures or dynamic images) from one of the external electronic devices within the group.

When the communication request is not received from the one of the external electronic devices, the controller 280 receives the location information from the external electronic devices within the group in operation 803.

When the communication request is received from one of the external electronic devices, the controller 280 notifies of direction information on the external electronic device in operation 809 and communicates with the external electronic device in operation 811. According to an embodiment of the present disclosure, a method of notifying of the direction information on the external electronic device may include a method of controlling localization according to the relative direction information on the external electronic device and a method of displaying a text message in accordance with the relative direction information on the external electronic device.

According to an embodiment of the present disclosure, when the controller 280 receives a voice message from the external electronic device, the controller 280 may control localization based on relative direction information on the received voice message. The method of controlling the localization may be performed when there are two or more audio output devices (e.g., earphones). The controller 280 may control the localization to output a voice message to the corresponding audio output device (e.g., in a case of the earphones, a left earphone and a right earphone). When the voice message is received, direction information on the external electronic device may be also received. The controller 280 may reversely calculate the relative direction information on the external electronic device by using the received direction information on the external electronic device.

For example, when the user wears the earphones, the controller 280 may output an audio signal to an earphone (e.g., the left earphone or the right earphone) corresponding to the direction, in which the localization is controlled, based on the relative direction information. The user may predict the direction of the external electronic device, from which the voice message is transmitted, through the output audio signal.

According to an embodiment of the present disclosure, when the voice message is received, the controller 280 may output a text message based on the relative direction information on the transmitted voice message. For example, when the message transmitted by the external electronic device located in the right side is received, the controller 280 may display the message by applying a visual effect for gradually moving the message in a left direction from a right boundary of the display unit 231.

The method of notifying of the relative direction information on the external electronic device by the reception electronic device is described below with reference to FIGS. 9A and 9B.

According to an embodiment of the present disclosure, when the icons of the external electronic devices are displayed in operation 805, if the icon is set as a default image or is displayed as null (i.e., when the information on the electronic device includes no image information) the controller 280 may analyze the received voice message and display the icon by using an image according to the analysis. When the voice message is received from the external electronic device, the controller 280 may compare a voice included in the voice message with speaker voice information stored in the storage unit 220. Through the comparison operation, the controller 280 may distinguish a gender or age (adult/child) which matches the voice, and display the determined image information as the icon of the external electronic device. The controller 280 may replace the basic image set by default with the image according to the voice analysis result. For example, when a female voice is determined based on the voice comparison result, the controller 280 may display a female image as the icon of the corresponding external electronic device. Alternatively, when a male voice is determined based on the voice comparison result, the controller 280 may display a male image as the icon of the corresponding external electronic device.

According to an embodiment of the present disclosure, the controller 280 may change a background image of a message chatting window displayed on the wearable device connected through the second communication unit 212 as well as the icons of the external electronic devices. For example, the controller 280 may transmit information corresponding to the analyzed voice to the wearable device. The wearable device having received the information may change a color or an image of the message chatting window based on the information. Alternatively, the wearable device may allow an external notification light (LED) to have a color based on the information. For example, in a case of the female based on the voice comparison result, the controller 280 may display a pink color. In a case of the child, the controller 280 may display a yellow color. A detailed description thereof will be made below with reference to FIG. 9C.

Figure 9A:
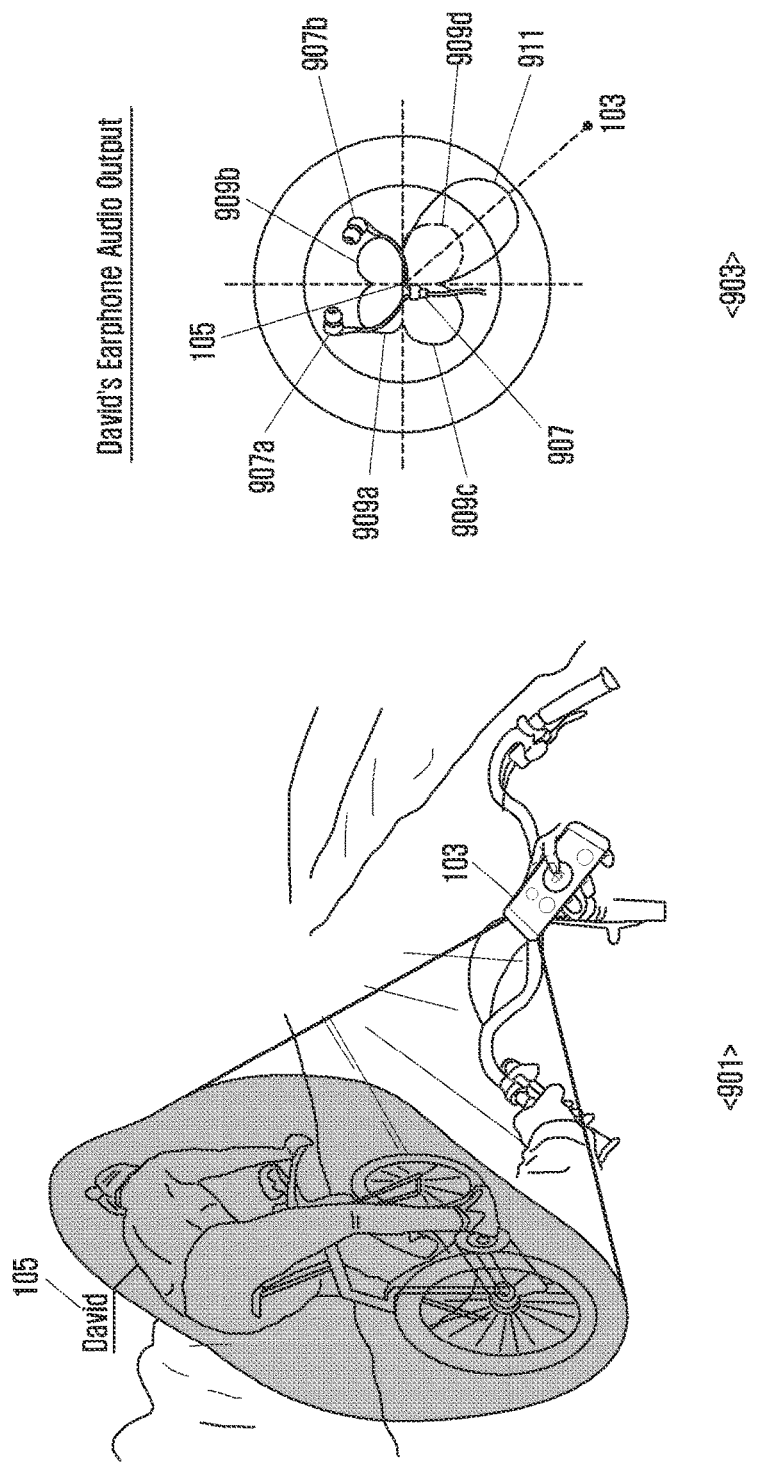
FIGS. 9A, 9B, and 9C illustrate a method of notifying of relative direction information on external electronic devices by a reception electronic device according to an embodiment of the present disclosure.
Figure 9B:
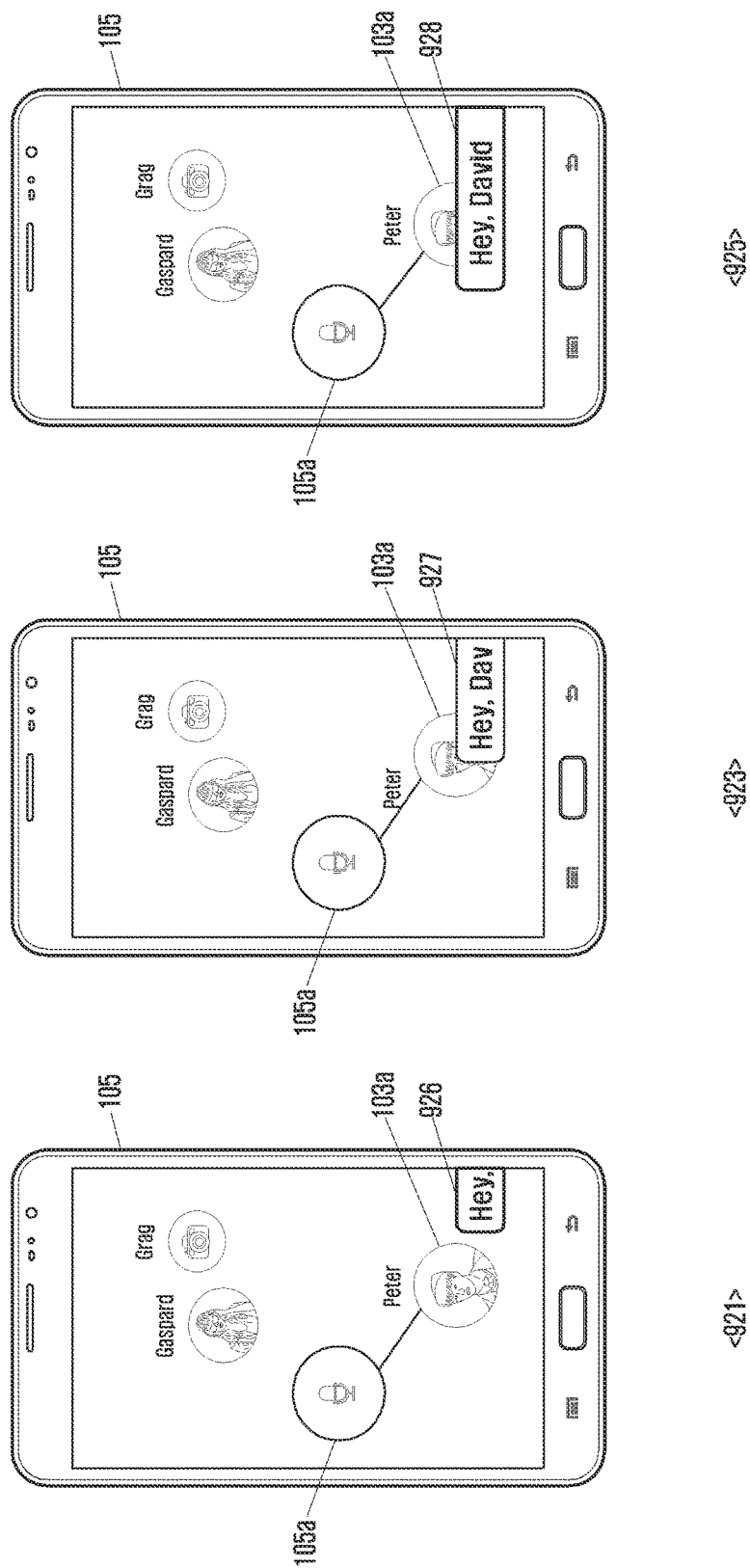
Figure 9C:
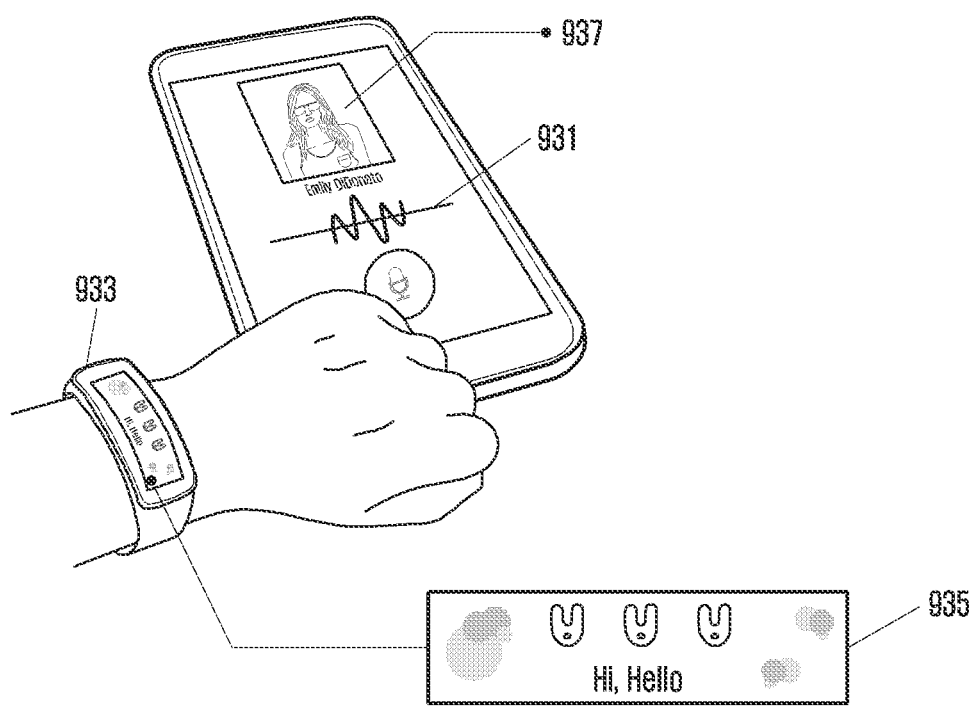

FIGS. 9A to 9C illustrate a method of notifying of relative direction information on the external electronic devices by the reception electronic device according to an embodiment of the present disclosure.

Referring to FIGS. 9A to 9C, as illustrated in reference numeral 901 of FIG. 9A, the electronic device 105 of "David" may receive a voice message from the external electronic device 103 located at the lower right side. The electronic device 105 of "David" may control to output the message only from a right audio device by controlling localization corresponding to the lower right direction. By controlling to output the message only from the right audio device, the user may receive an effect as if the sound comes from the lower right direction. As illustrated in reference numeral 903 of FIG. 9A, when the external electronic device 103 transmits a message to the electronic device 105, the electronic device 105 may control a range 909d among localization control ranges 909a, 909b, 909c, and 909d based on relative direction information on the external electronic device 103 by controlling the localization, thereby significantly adjusting an audio output range as indicated by reference numeral 911. An audio output device 907 may have a left audio output device 907a and a right audio output device 907b, and the controller 280 may make a control to output an audio signal only from the right audio output device 907b corresponding to the relative direction information on the external electronic device having transmitted the message. The electronic device according to an embodiment of the present disclosure may provide the user with an effect as if a sound comes from the diagonal back side. The user may know a message transmission direction through the direction in which the audio signal is output (for example, the right output device).

Referring to FIG. 9B, the electronic device 105 receives a message "Hey, David" from the electronic device of "Peter". As illustrated in FIG. 9B, the electronic device 105 and the electronic device of "Peter" are communicating with each other while the icon 105a of the electronic device 105 and the icon 103a of the electronic device of "Peter" are connected through a connection line. When the electronic device 105 receives a message from the electronic device of "Peter" located at the lower right side, the electronic device 105 may apply a visual effect as if the message "Hey, David" moves from the right side to the left side sequentially as indicated by reference numerals 921, 923, and 925 of FIG. 9B to display the message. Alternatively, the controller 280 may apply a visual effect as if the message moves from the lower right diagonal side to the upper left diagonal side to display the message. The controller 280 may control the display unit 231 to display the message while the message moves from the right side to the left side sequentially like "Hey" 926 as indicated by reference numeral 921 of FIG. 9B, "Hey, Day" 927 as indicated by reference numeral 923 of FIG. 9B, and "Hey, David" 928 as indicated by reference numeral 925 of FIG. 9B.

When the voice message is received from the external electronic device, the controller 280 may compare a voice included in the voice message with speaker voice information stored in the storage unit 220 as illustrated reference numeral 931 of FIG. 9C. Through the comparison operation, the controller 280 may determine speaker information (e.g., gender or age e.g. adult/child) corresponding to the voice and display an image 937 according to the determination. Image information corresponding to the speaker information may be also stored in the storage unit 220.

According to an embodiment of the present disclosure, when the controller 280 is connected to a wearable device 933 for communication, the controller 280 may transmit the speaker information to the wearable device 933. The wearable device 933 may display a color or an image corresponding to the received speaker information on the screen of the wearable device 933 as indicated by reference numeral 935 of FIG. 9C.

While the present has been shown and described with reference to various embodiments thereof, it will be understood by those skilled in the art that various changes to form and details may be made therein without departing from the spirit and scope of the present disclosure as defined by the appended claims and their equivalents.

What is claimed is:

1. An electronic device comprising:
   a first communication unit configured to communicate with at least one external electronic device;
   a sensor unit configured to detect a motion of the electronic device; and
   a controller configured to:
      form a group for communication with the at least one external electronic device,
      receive location information from the at least one external electronic device,
      detect a motion of the electronic device through the sensor unit,
      select at least one external electronic device corresponding to direction information of the electronic device determined in response to the motion of the electronic device,
      control the first communication unit to communicate with the at least one selected external electronic device,
      measure a motion angle of the electronic device in response to the detection of the motion of the electronic device, and
      select at least one external electronic device included in a range of the measured motion angle.

2. The electronic device of claim 1, further comprising:
   a location collector configured to collect current location information on the electronic device,
   wherein the controller is further configured to determine relative direction information and distance information on the at least one external electronic device based on location information on the at least one external electronic device and the current location information on the electronic device.

3. The electronic device of claim 2, further comprising:
   a display unit configured to display an icon of the electronic device and icons of the at least one external electronic device,
   wherein the controller is further configured to:
      control the display unit to display the icons of the at least one external electronic device according to the relative direction information and the distance information based on the icon of the electronic device, or control sizes of the icons of the at least one external electronic device in proportion to the distance information based on the icon of the electronic device, and
      display the controlled icons.

4. The electronic device of claim 3, wherein the controller is further configured to control the display unit to display the icons such that the icon of the electronic device and the icon of the at least one selected external electronic device are connected through a connection line, or to activate the icon of the at least one selected external electronic device and display the activated icon.

5. The electronic device of claim 1, further comprising:
   a second communication unit configured to communicate with a wearable device,
   wherein, the controller is further configured to, when the controller communicates with the wearable device through the second communication unit:
      receive a motion angle of the wearable device from the wearable device, and
      select at least one external electronic device to communicate with, based on the received motion angle.

6. The electronic device of claim 1, wherein the controller is further configured to:
   receive a communication request from one of the at least one external electronic device, and
   notify of relative direction information on the external electronic device having made the communication request.

7. The electronic device of claim 6, wherein the controller is further configured to:
control an audio parameter based on the relative direction information on the external electronic device having made the communication request and output the controlled audio parameter, or
move a text message in accordance with the relative direction information on the external electronic device having made the communication request and notify of the relative direction information on the external electronic device having made the communication request.

8. The electronic device of claim 1, wherein the controller is further configured to:
transmit a broadcasting message to a particular direction through antenna beamforming of the electronic device, and
acquire location information on the at least one external electronic device through a response message of the broadcasting message.

9. An electronic device comprising:
a first communication unit configured to communicate with at least one external electronic device;
an audio processor configured to receive a voice signal including a direction indication language related to direction information of the at least one external electronic device to communicate with; and
a controller configured to:
form a group for communication with the at least one external electronic device,
receive location information from the at least one external electronic device,
select at least one external electronic device corresponding to direction information related to the direction indication language received through the audio processor, and
control the first communication unit to communicate with the at least one selected external electronic device.

10. A method of communicating by an electronic device, the method comprising:
forming a group for communication with at least one external electronic device;
receiving location information from the at least one external electronic device;
detecting a motion of the electronic device through a sensor unit;
selecting at least one external electronic device corresponding to direction information of the electronic device determined in response to the motion of the electronic device; and
communicating with the at least one selected external electronic device,
wherein the selecting of the at least one external electronic device comprises:
measuring a motion angle of the electronic device in response to the detecting of the motion of the electronic device, and
selecting at least one external electronic device included in a range of the measured motion angle.

11. The method of claim 10, further comprising:
receiving current location information on the electronic device,
wherein the receiving of the current location information comprises:
comparing the location information on the at least one external electronic device with the current location information on the electronic device, and
determining and displaying relative direction information and distance information on the at least one external electronic device.

12. The method of claim 11, wherein the determining and displaying of the relative direction information and the distance information comprises:
displaying icons of the at least one external electronic device according to the relative direction information and the distance information based on the icon of the electronic device; or
controlling sizes of the icons of the at least one external electronic device in proportion to the distance information based on the icon of the electronic device and displaying the controlled icons.

13. The method of claim 12, wherein the determining and displaying of the relative direction information and the distance information comprises:
displaying the icons such that the icon of the electronic device and the icon of the at least one selected external electronic device are connected through a connection line; or
activating the icon of the at least one selected external electronic device and displaying the activated icon.

14. The method of claim 10, wherein the selecting of the at least one external electronic device to communicate with comprises:
when the electronic device communicates with a wearable device, receiving a motion angle of the wearable device from the wearable device and selecting at least one external electronic device to communicate with, based on the received motion angle.

15. The method of claim 10, further comprising:
receiving a communication request from one of the at least one external electronic device; and
notifying of relative direction information on the external electronic device having made the communication request.

16. The method of claim 15, wherein the notifying of the relative direction information on the external electronic device having made the communication request comprises:
notifying of the relative direction information on the external electronic device having made the communication request through at least one of a method of controlling an audio parameter based on the relative direction information on the external electronic device having made the communication request, and
outputting the controlled audio parameter and a method of moving a text message in accordance with the relative direction information on the external electronic device having made the communication request.

17. The method of claim 10, wherein a broadcasting message is transmitted to a particular direction through antenna beamforming of the electronic device and the location information is acquired through a response message of the broadcasting message.

18. A method of operating communication by an electronic device, the method comprising:
forming a group for communication with at least one external electronic device;
receiving location information from the at least one external electronic device within the group;
when a direction indication language is received, selecting at least one external electronic device corresponding to direction information related to the direction indication language received through an audio processor; and communicating with the at least one selected external electronic device, wherein the direction indication language is related to a direction information of the at least one external electronic device to communicate with.

* * * * *